June 16, 1942.  A. C. SCHROEDER  2,286,579
CONVEYING ELEMENT
Filed Feb. 13, 1941

INVENTOR
Arthur C. Schroeder
BY J. Stanley Churchill
ATTORNEY

Patented June 16, 1942

2,286,579

UNITED STATES PATENT OFFICE 2,286,579

CONVEYING ELEMENT

Arthur C. Schroeder, Syracuse, N. Y., assignor to Redler Conveyor Company, Quincy, Mass., a corporation of Massachusetts Application February 13, 1941, Serial No. 378,732

13 Claims. (Cl. 198—168)

This invention relates to a conveying element.

The invention has for an object to provide a novel and efficient conveying flight of a construction which lends itself to economical manufacture from a unitary length of bar stock, which may be detachably connected to other similarly constructed flights to form a conveying element adapted to be drawn through a trough or casing to convey flowable solid material therethrough in accordance with the principles set forth in the Redler Reissue Patent No. 18,445.

A further object of the invention is to provide a novel endless conveying element embodying flight members of the structure above referred to, and also embodying one key flight member for connecting all of the flights to form an endless conveying element, and whose construction is such as to facilitate the assembly or detachment of the individual flights making up the endless conveying element.

With these general objects in view, and such others as may hereinafter appear, the invention consists in the conveyer flight, in the conveying element, and in the various structures, arrangements, and combinations of parts hereinafter described and particularly defined in the claims at the end of this specification.

Figure 1:
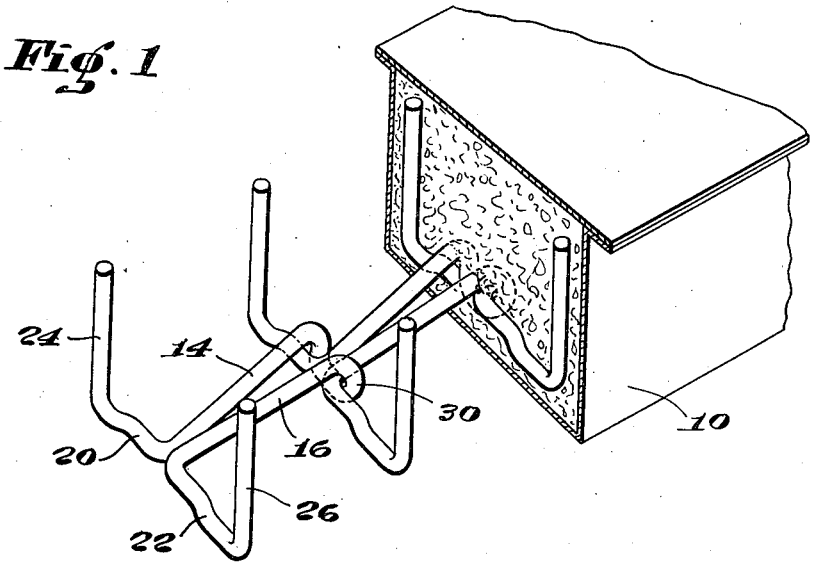
Figure 2:
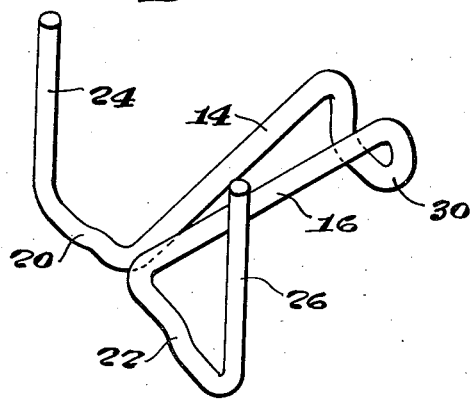
Figure 3:
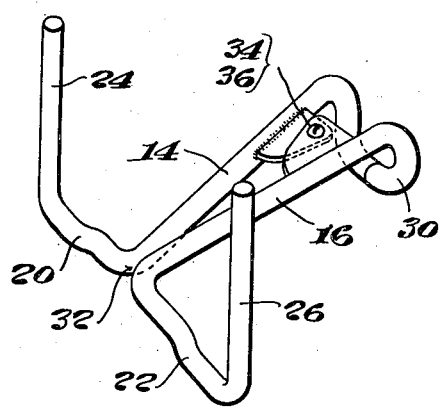
Figure 5:
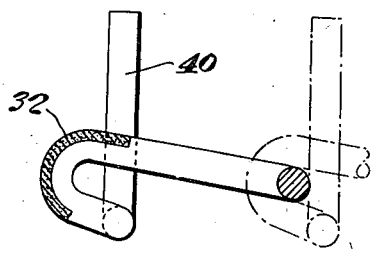
Figure 4:
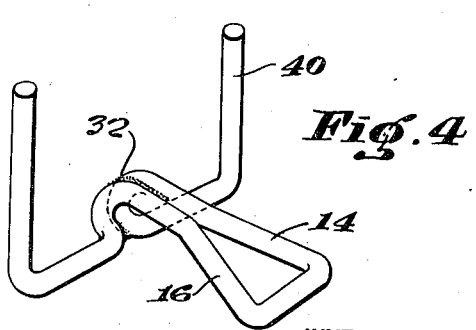

In the drawing illustrating the preferred embodiment of the invention, Fig. 1 is a perspective view of a portion of a conveyer embodying the present conveying element; Fig. 2 is a perspective view of one of the conveyer flights; Fig. 3 is a similar view of one form of key conveyer flight; and Figs. 4 and 5 are views in perspective and in longitudinal section of a modified form of the invention.

In general the present invention contemplates a conveyer flight formed of bar stock die formed into a shape such as to enable adjacent flights to be connected together to form a conveying element in a novel, simple and practical manner. In the preferred form of the invention a unitary length of bar stock is shaped to provide a longitudinally extended tension member having a downwardly disposed U-shaped portion at one end thereof and having its forward end shaped to form an open flight. Adjacent flights may be connected together by the disposition of such U-shaped portion of one flight under the tension element of the next adjacent flight.

Referring now to the drawing, 10 represents a casing through which the present conveying element is adapted to be drawn to convey solid flowable material therethrough in a continuous stream. The present conveying element comprises a unitary length of bar stock shaped by die forming operations to provide two contiguous longitudinally extended members 14, 16 comprising a tension member, and having one end of said members bent to extend transversely at 20, 22 and having the ends 24, 26 thereof bent upwardly to form with the transversely extended portions a U-shaped open flight at one end of the tension member. The second end of said longitudinally extended members are connected by a downwardly extended loop 30, and the longitudinally extended members may and preferably will be welded together as indicated at 32 to secure the parts in operative position. In assembling successive conveyer flights to form an endless conveying element the downwardly extended loop 30 of one flight member is slipped over the adjacent end of a succeeding flight member to dispose the loop under the forward end of the longitudinal members 14, 16 comprising the tension member of the succeeding flight, thus detachably connecting together the flights. In order to complete the formation of an endless conveying element one of the flights may and preferably will be formed of two half sections as illustrated in Fig. 3, detachably connected together by a bolt and nut 34, 36, extended through aligned holes in lugs welded, brazed, or otherwise secured to the longitudinally extended members forming the tension member of such a key flight. In use after all of the individual flights have been detachably connected together, the last two are connected by means of the key flight, as will be apparent from an inspection of Fig. 3. In Figs. 4 and 5 I have illustrated a modified form of the invention wherein the flight is formed by a unitary length of bar stock shaped to provide an open flight 40 at one end and a loop at the second end for connection to a succeeding flight. In practice the longitudinally extended members 14, 16 may be shaped to form a hook at the forward end thereof with which the loop of the next succeeding flight cooperates, as indicated in Fig. 4, to detachably connect the flights. The longitudinally extended members may and preferably will be welded together to form a unitary structure.

From the description thus far it will be apparent that the present invention provides a simple construction of conveyer flight which may be detachably connected to other similar flights to form a conveying element suitable for use with advantage in conveying solid flowable material through a casing. By constructing the individual flights of a unitary length of bar stock the conveying element may be constructed of a wide variety of metals and alloys including those which are difficult to cast, thereby adapting the conveying element for special conditions of use and for handling materials for which prior conveying elements of the cast iron and cast steel type are not most suitable.

While in the illustrated form of conveyer flight the flight portion has been illustrated as of U-shape, it will be understood that if found of advantage other forms of open flights may be provided, and while the preferred embodiment of the invention has been herein illustrated and described it will be understood that the invention may be embodied in other forms within the scope of the following claims.

Having thus described the invention, what is claimed is:

1. A conveyer flight comprising a unitary length of bar stock shaped to provide a transversely extended open flight and a longitudinally extended tension member projecting medially therefrom, said tension member having provision for detachable connection to an adjacent flight.

2. A conveyer flight comprising a unitary length of bar stock shaped to provide a transversely extended open flight and a longitudinally extended tension member, the latter being provided with a downwardly extended loop at the end remote from said flight adapted to extend under the tension member of an adjacent flight to detachably connect the flights together.

3. A conveyer flight comprising a unitary length of bar stock shaped to provide two contiguous longitudinally extended members forming a tension member and being connected at one end by a downwardly extended looped portion, said members having their second ends extending transversely and upwardly to form an open flight.

4. A conveyer flight comprising a unitary length of bar stock shaped to provide two longitudinally extended and contiguous members forming a tension element and having provision at one end for connection to an adjacent flight and having the second end thereof shaped to form an open flight, said members being welded together at said second end of said tension element.

5. In an endless conveying element, a plurality of generally similar detachably connected flight units, each comprising a length of bar stock shaped to provide an open flight, and a longitudinally extended tension member projecting therefrom and having a downwardly extended loop at its end adapted to be disposed under the tension member of the next adjacent flight, one of the flight units being formed of two sections detachably secured together and comprising a key flight.

6. A conveyer element comprising, a unitary length of bar stock bent to form a loop substantially medially of the length thereof and with the portions adjacent said loop extending away from said loop and converging toward each other to provide a tension member, and flight portions extending laterally in opposite directions from said converging portions at approximately the apex of their point of convergence, said laterally extending portions terminating in upwardly extending end portions.

7. A conveyer element comprising a unitary length of bar stock bent to form a transverse flight portion and including a member adapted to be subjected to tension, said tension member comprising a downwardly extending loop formed at one end thereof with the portions of said tension member converging toward each other away from said loop and engaging each other at the opposite end of said tension member, the engaging portions of said tension member being welded together, said transverse flight portion being carried by the welded end of said tension member.

8. A conveyer flight comprising a unitary length of bar stock shaped to provide a loop substantially medially of its length and including portions converging toward each other away from said loop to form a tension member and then extending laterally in opposite directions and then upwardly to form material-engaging portions of the flight, said loop extending in a plane generally at right angles to the plane of said converging portions of said tension member.

9. A conveyer flight comprising, two complemental sections each having a half-flight portion and a tension element, each of said tension elements having the end thereof remote from said flight portion shaped to provide a half-loop, said tension elements being arranged in contiguous relation, and means detachably connecting said sections together in said relation.

10. A conveyer element comprising a flight portion and a tension member, said tension member having a loop portion at one end thereof and including contiguous portions between said loop portion and said flight portion, said tension member having its continuity interrupted to divide said flight into two sections, and means detachably connecting said sections together.

11. A conveyer element as defined in claim 10, in which the tension member is interrupted at the loop portion.

12. A conveyer element as defined in claim 10, in which the means for detachably securing the flight sections together includes a lug projecting from each of the contiguous portions of the tension member, said lugs overlapping and being connected together by a screw.

13. A conveyer flight as defined in claim 10, in which the tension member is interrupted at the loop portion, and in which the means for detachably securing the flight sections together includes a lug projecting from each of the contiguous portions of the tension member, said lugs overlapping and being connected together by a screw.

ARTHUR C. SCHROEDER.